US011722162B1

(12) United States Patent
Luo et al.

(10) Patent No.: US 11,722,162 B1
(45) Date of Patent: Aug. 8, 2023

(54) RF CIRCUIT PROTECTION DEVICES AND METHODS

(71) Applicant: pSemi Corporation, San Diego, CA (US)

(72) Inventors: Chengkai Luo, San Diego, CA (US); Payman Shanjani, San Diego, CA (US); Ravindranath D. Shrivastava, San Diego, CA (US)

(73) Assignee: PSEMI CORPORATION, San Diego, CA (US)

( * ) Notice: Subject to any disclaimer, the term of this patent is extended or adjusted under 35 U.S.C. 154(b) by 0 days.

(21) Appl. No.: 17/649,717

(22) Filed: Feb. 2, 2022

(51) Int. Cl.
*H04B 1/44* (2006.01)
*H04B 1/04* (2006.01)
*H01Q 1/50* (2006.01)

(52) U.S. Cl.
CPC ............. *H04B 1/0466* (2013.01); *H01Q 1/50* (2013.01); *H04B 1/0458* (2013.01)

(58) Field of Classification Search
CPC .......... H04B 1/0466; H04B 1/04; H04B 1/16; H04B 1/1615; H04B 1/40; H04B 1/44
See application file for complete search history.

(56) References Cited

U.S. PATENT DOCUMENTS

| | | | |
|---|---|---|---|
| 7,307,494 B2 | 12/2007 | Erb | |
| 8,086,191 B2 | 12/2011 | Fukuda et al. | |
| 10,469,122 B2* | 11/2019 | Patel | H04B 1/44 |
| 11,044,671 B2* | 6/2021 | Liu | H04W 52/0229 |
| 2013/0157595 A1 | 6/2013 | Wan | |
| 2014/0049441 A1 | 2/2014 | Chen et al. | |
| 2017/0338851 A1 | 11/2017 | Sugaya | |

OTHER PUBLICATIONS

International Search Report and Written Opinion for International Application No. PCT/US2023/061663 filed on Jan. 31, 2023 on behalf of Psemi Corporation dated May 15, 2023 8 pages.

* cited by examiner

*Primary Examiner* — Tuan Pham
(74) *Attorney, Agent, or Firm* — Steinfl + Bruno LLP

(57) ABSTRACT

Fail-safe methods and devices to protect the receiver of a transceiver in the event of an antenna failure are disclosed. The described devices implement inductive and capacitive elements to replace switches and can be used in any communication system or electronic circuit where the protection of a portion of the device from higher power signals is required. The inductive elements can be implemented using already existing inductors that are constituents of the receiver matching network. Configurations with off-chip capacitive or inductive components are also possible.

15 Claims, 8 Drawing Sheets

200A

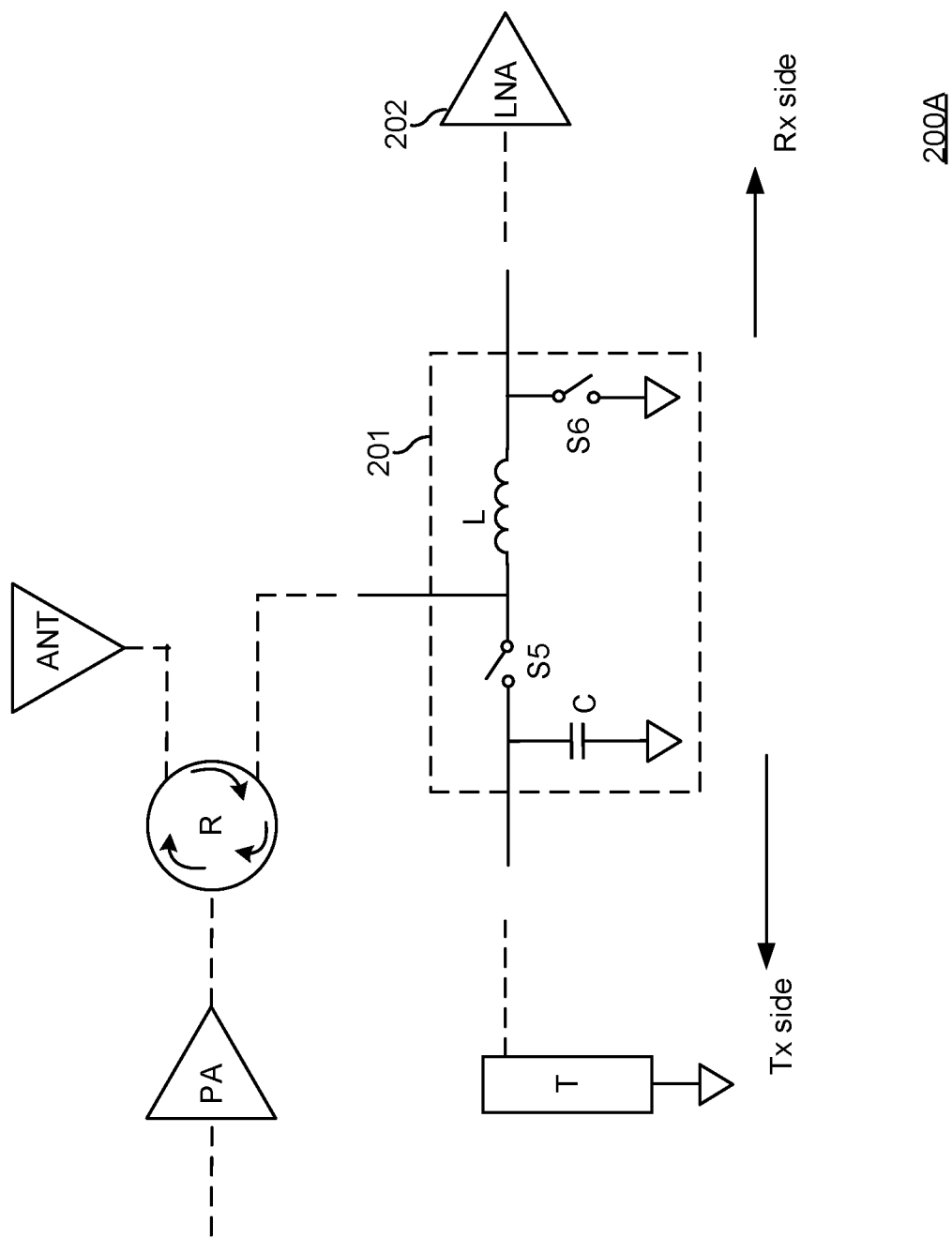

|  | Circuit block 101 of Fig. 1A | Circuit block 201 of Fig. 2A |
|---|---|---|
| Number of switches | 4 | 2 |
| Switch stack size | large (e.g. more than 32) | smaller (e.g. less than 8) |
| Capacitive compensation | present | not present |
| Power handling capability | limited by capacitive compensation and the switch stack size | larger |
| switching time | 1us | 0.75 us |
| Bandwidth | >1GHz, >50% BW | >1GHz, >50% BW |
| Off-chip component | not present | present |

RF CIRCUIT PROTECTION DEVICES AND METHODS

TECHNICAL FIELD

The present disclosure is related to methods and devices for protecting radio frequency (RF) circuits, more in particular to fail-safe methods and devices using inductive and capacitive elements arranged as LC tanks. Throughout this document the term "fail-safe" refers to devices and/or methods that provide relief ("safe") from unwanted ("fail") conditions and are, for example, implemented as part of RF transceivers or RF communication devices. Such devices or methods are used, for example, to protect an RF receiver from higher power signals reflecting from the transmit side and/or leaking to the receiver side in the event of, for example, antenna failure.

BACKGROUND

In order to protect the receiver side of a transceiver or communication circuit, fail-safe devices are generally implemented. FIG. 1A show a communication circuit (100A) including a power amplifier (PA), rotator (R), and antenna (ANT). Such communication circuit further includes a circuit block (101) that can be generally used as a fail-safe device. Circuit block (101) comprises through switches (S1, S3), and shunt switches (S2, S4). On a first side or port (also called transmit side throughout the present disclosure), circuit block (101) may be coupled to a transmit termination (T) and on a second side or port (also called receive side throughout the present disclosure), an (LNA) low noise amplifier (102) may be coupled to circuit block (101).

Communication circuit (100A) of FIG. 1A can function in a transmit mode and a receive mode. When in transmit mode, rotator (R) is configured such that the signal from power amplifier (PA) is conveyed to antenna (ANT) for transmission. When operating in the receive mode, rotator (R) is configured such that the signal from antenna (ANT) is received by LNA (102) and rest of the receiver.

FIG. 1B shows communication circuit (100A) of FIG. 1A operating in the transmit mode. In the event of an antenna failure, rotator (R) is configured to redirect the reflected signal back to the transmit side of circuit block (101) through a common port of circuit block (101), as indicated by arrow (110). As the circuit is in transmit mode, the power of the redirected signal reflecting back from the transmitter and potentially leaking into the receiver can be very high, e.g., 53 dBm or higher with peak-to-average ratio of, for example, around 6 dB. The role of circuit block (101) is to protect the receiver, e.g. LNA (102), against such high power. In order to perform this task, in case of antenna failure and when in transmit mode, through or series switch (S1) is controlled to be in OFF state (open) and shunt switch (S2) in ON state. On the transmit side, through or series switch (S3) is in ON state and shunt switch (S4) is in OFF state. In other words, as the high Tx power (110) is passed to the termination (T), switches (S1, S4) are required to handle a high voltage in their OFF state situation. High power requirements such as 51 dBm (peak voltage of 112V) result in challenges in the design of such switches.

To further clarify the mentioned design challenges, as an example, large switch stacks having 32 transistors or more may be required to meet the higher power requirement. Such stacked switches are also sensitive to parasitic and compensation capacitors are often needed to be implemented as part of the switch stack design. This will add another layer of complexity to the overall design. In addition, the space required by such large switch stacks may be prohibitive depending on the application and related footprint requirements. Aside from large power handling, through switch (S1) is also required to have a lower insertion loss to ensure that a receiver noise figure (NF) requirement (which can also be stringent due to the overall receiver performance requirement) is also met.

FIG. 1C shows communication circuit (100A) of FIG. 1A operating in a receive mode. In this case, the power of the received signal flowing to the receiver in the direction shown by arrow (120) is not very high and power handling capability is less of an issue compared to the transmit mode and, in particular, in the event of an antenna failure. As shown, in the receive mode through switch (S1) is in ON state (closed) to convey the received signal to LNA (102), and shunt switch (S2) is in OFF state (open). Moreover, through switch (S3) is in OFF state (open) and shunt switch (S4) is in ON state (closed).

In view of the above, there is a need for fail-safe devices that meet conflicting and often stringent requirements such as higher power handling capability, smaller footprint and lower insertion loss.

SUMMARY

The disclosed methods and devices address the above-mentioned challenges and design problems.

According to a first aspect of the present disclosure, a radio frequency (RF) switch circuit for switching RF signals is provided, comprising: a common port configured to receive an RF signal with a signal frequency; a first output port and a second output port; a through switch configured to couple the common port to the second output port in a first mode (TX) of the RF switch circuit and decouple the common port from the second output port in a second mode (RX) of the RF switch circuit; a shunt switch configured to couple the first output port to a reference potential in the first mode (TX) and decouple of the first output from the reference potential in the second mode (RX); an inductive element between the common port and the first output port; and a capacitive element between the second output port and the reference potential, wherein a combination of the inductive element and the capacitive element is configured to resonate at the signal frequency in the first mode (TX) by being connected together by the through switch and by the shunt switch, and combination of the through switch and the shunt switch connecting the inductor and the capacitive element to the reference potential, and decouple , in the first mode (TX), the common port from the first output port and the second output port from the reference potential thus isolating, in the first mode (TX), the RF signal from the first output port.

According to a second aspect of the present disclosure, in a radio frequency (RF) circuit with a through switch between a first RF port and a second RF port and a shunt switch between the first RF port and ground, a method for protection from an unwanted RF signal is disclosed, the method comprising: providing the RF circuit with an inductive element in series with the through switch between the first RF port and the second RF port, the inductive element having a selected inductance value; and providing the RF circuit with a capacitive element between the second RF port and ground, the capacitive element having a selected capacitance value so that a tank circuit formed by the inductive element and the capacitive element resonates at a frequency of the unwanted RF signal when the through switch and the shunt switch are in an ON state, forming a high impedance path to the first RF port for the unwanted RF signal, thus decoupling the unwanted RF signal from the first RF port and routing the unwanted RF signal to the second RF port through the through switch.

Further aspects of the disclosure are provided in the description, drawings and claims of the present application.

DESCRIPTION OF THE DRAWINGS

FIG. 2A shows an exemplary communication circuit according to an embodiment of the present disclosure.

FIG. 3 shows an exemplary table summarizing the benefits of the disclosed teachings and devices.

Like reference numbers and designations in the various drawings indicate like elements.

DETAILED DESCRIPTION

FIG. 2A shows an exemplary communication circuit (200A) according to an embodiment of the present disclosure. Communication circuit (200A) comprises a power amplifier (PA), rotator (R), and antenna (ANT). Such communication circuit further comprises a circuit block (201), such as an RF switch, that can be used as a fail-safe device. Circuit block (201) comprises through inductive element (L), shunt capacitive element (C), through switch (S5), and shunt switch (S6). As also shown in FIG. 2A, on the transmit side, circuit block (201) may be coupled to transmit termination (T) at an output port. Moreover, an LNA (202) may be coupled to circuit block (201) on the receive side at another output port. As will be described in additional detail below, a combination of the constituents of circuit block (201), i.e. elements (L, C, S5, S6) is served a) in transmit mode, to protect the receiver, including LNA (202), in the case of an antenna failure, and b) in the receive mode, to convey the signal to the receiver.

Figure 2B:
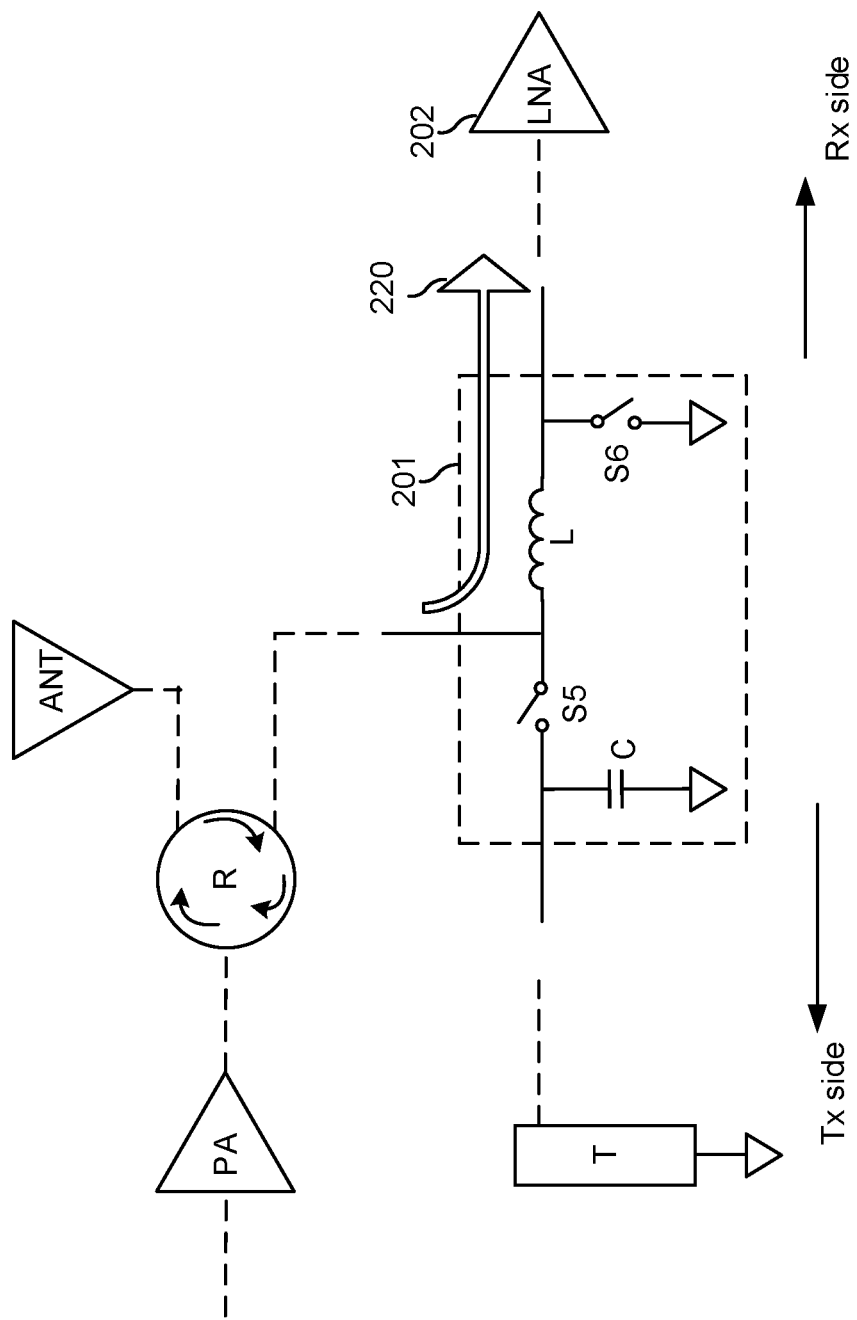
FIG. 2B shows the communication circuit of FIG. 2A operating in receive mode.

FIG. 2B shows communication circuit (200A) of FIG. 2A operating in the receive mode. In this case, the power of the received signal flowing to the receiver in the direction shown by arrow (220) is not very high and power handling capability is less of an issue compared to the transmit mode and, in particular, in the event of an antenna failure. As also shown, switches (S5, S6) are both in OFF state (open) in the receive mode. The inductive element (L) has an inductance value (e.g. 1.5 nH) selected to generate a low impedance in the path of the signal (220) coming from the antenna to the receiver side through the common port of the RF switch (201), thus allowing the signal to be fed to LNA (202). In some embodiments, may serve a matching function from, for example 50 ohms, to LNA device input impedance.

Figure 2C:
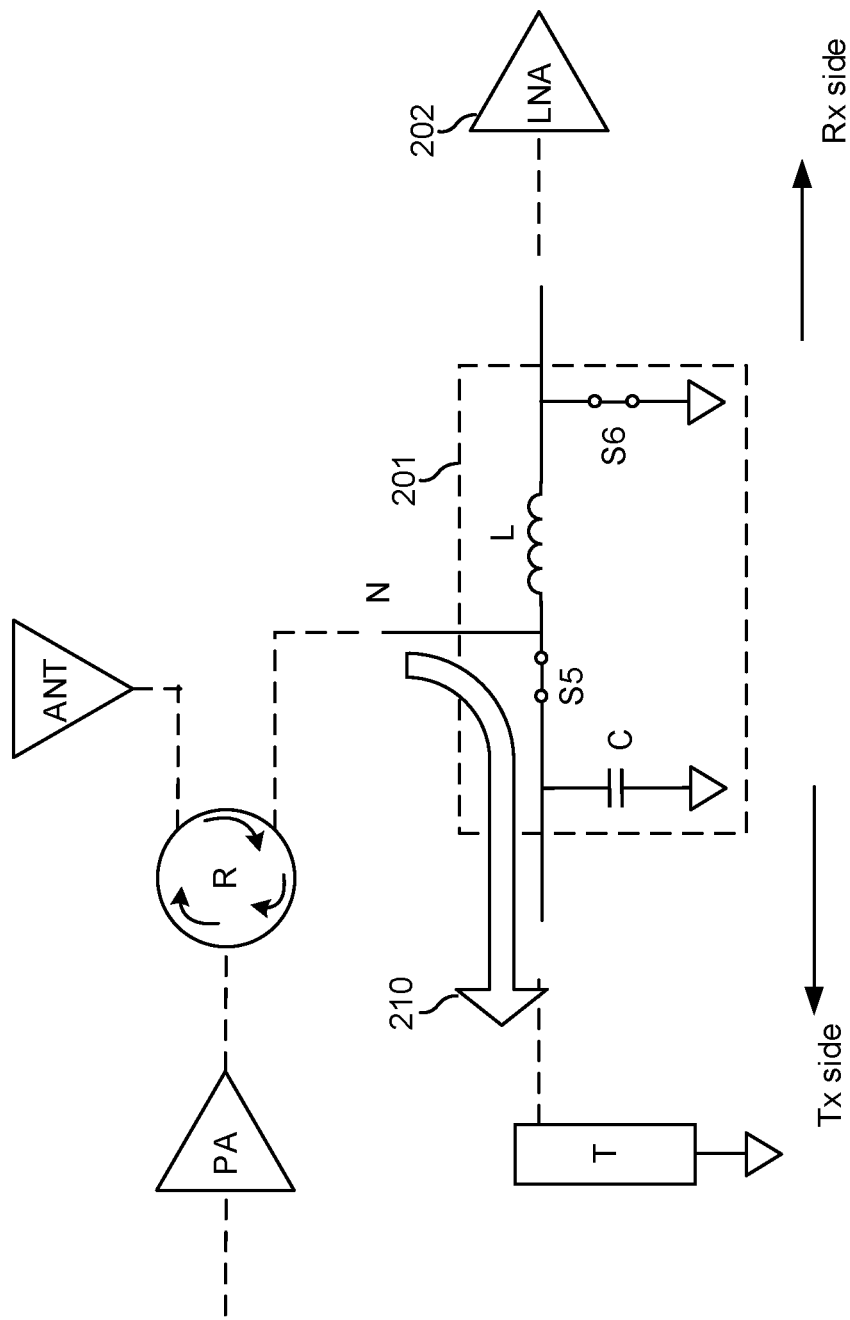
FIG. 2C shows the communication circuit of FIG. 2A operating in transmit mode.

FIG. 2C shows communication circuit (200A) of FIG. 2A operating in the transmit mode. In the event of an antenna failure, rotator (R) is configured to redirect the reflected signal back to the transmit side of circuit block (201) as indicated by arrow (210). As the circuit is in transmit mode, the power of the redirected signal reflecting back from the transmitter and leaking into the receiver can be very high. The role of circuit block (201) is to protect the receiver against such high power. In order to perform this, in the case of the antenna failure and when in transmit mode, through and shunt switches (S5, S6) are both in ON state (closed).

With further reference to FIG. 2C, according to the teachings of the present disclosure, a combination of inductive and capacitive elements (LC) is selected such that the resulting LC tank circuit may resonate at the transmit frequency. In other words, the resonant LC tank will generate a high impedance in the path of the signal coming from the antenna to the receiver side, thus protecting the receiver side and LNA (202) from the high power transmit signal. For example, if an inductance value of 1.5 nH is selected for L according to the example above, a capacitance value of 1.1. fF can be selected for C in order for the resulting parallel LC tank to resonate at a frequency of 3.8 GHz. Moreover, in the transmit mode, shunt switch (S6) is in closed position to shunt the leaked current to the receiver to the ground, thus providing an additional protection of the receiver. As mentioned previously, through switch (S5) is also in ON state (closed) during the transmit mode and as a result, the signal coming in from the antenna is mostly redirected to the transmit termination (T), in the direction as shown by arrow (210). In other words, high impedance in the right through portion and left shunt portion of the circuit block (201) is obtained through the resonant properties of an LC tank circuit instead of switches in an OFF configuration.

Figure 2E:
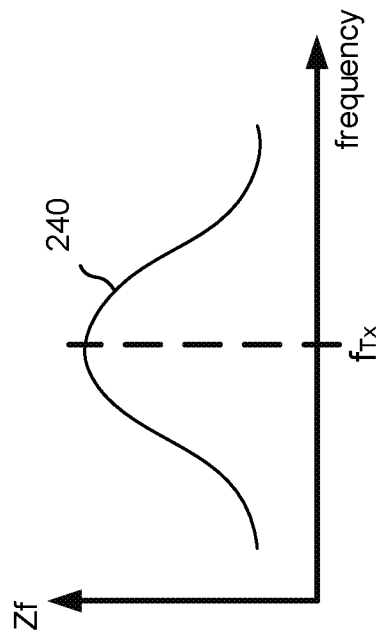
FIG. 2E shows the variation of an LC tank impedance vs. frequency.
Figure 2D:
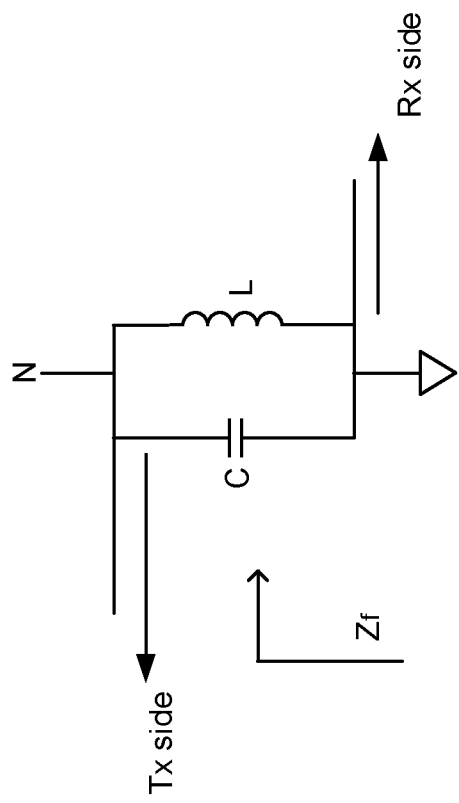
FIG. 2D shows a circuit equivalent of a portion of the communication circuit of FIG. 2C.

In order to further clarify the protection of the receiver side provided by the LC tank described above, reference is made to FIG. 2D wherein the embodiment shown represents an equivalent of the circuit downstream from node (N) of circuit (200A) of FIG. 2C. As shown, $Z_f$ represents the impedance seen from the transmitter into the LC tank. FIG. 2E shows a curve (240) representing such impedance as a function of frequency. As can be seen, the inductive and capacitive elements may be selected such that the resulting LC tank resonates at transmit frequency ($f_{Tx}$). As a result, and as described previously, a higher impedance is seen from the transmitter to the receiver side, thus providing the receiver with the required protection from the high power transmit signal reflected back from the failed antenna. The LC tank behavior would instead not operate in the receive mode, as in such mode switch (S5) would be OFF (open), thus establishing a low impedance path from the common port to the receive port of the circuit block (201).

Figure 1A:
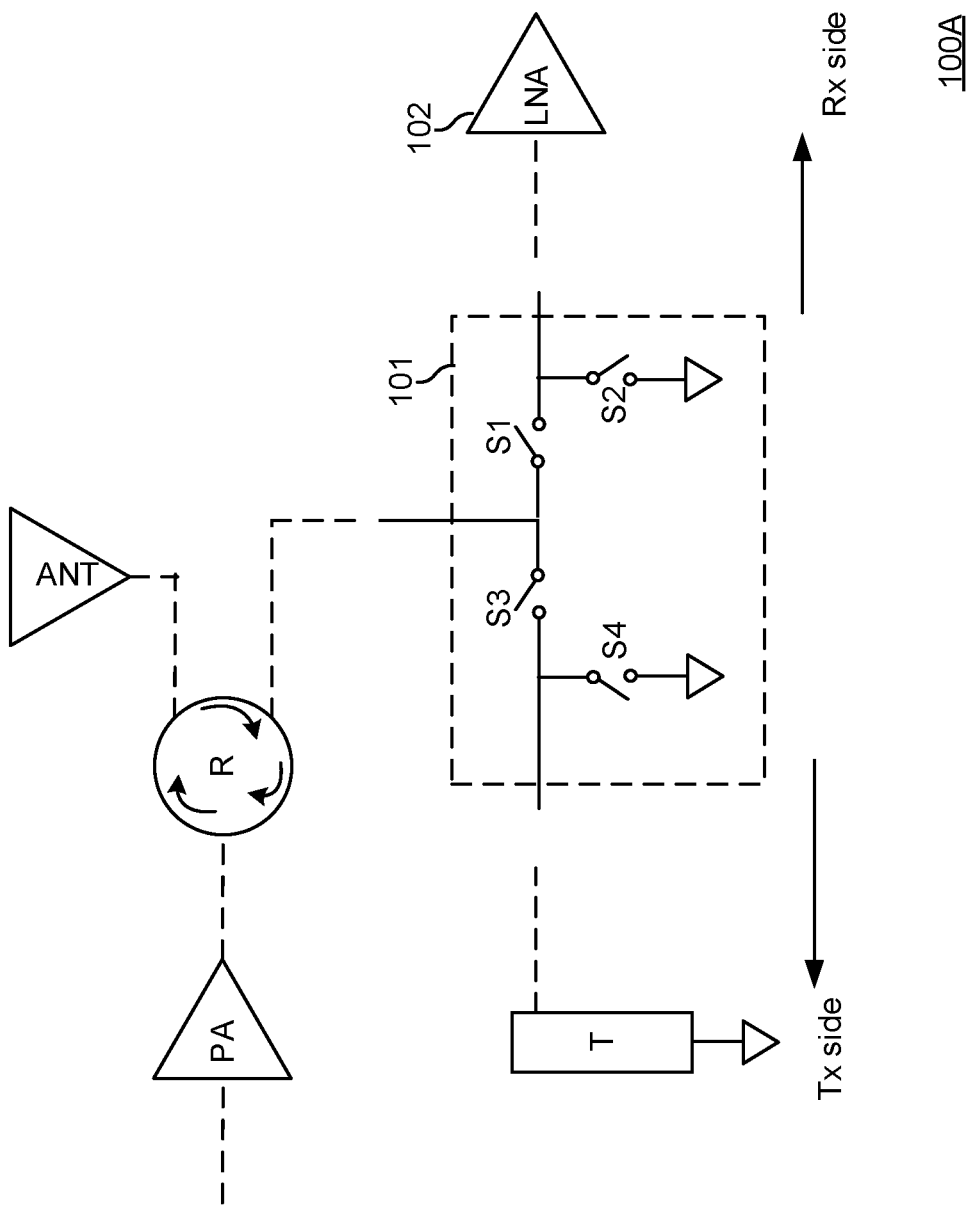
FIG. 1A shows a prior art communication circuit.
Figure 1B:
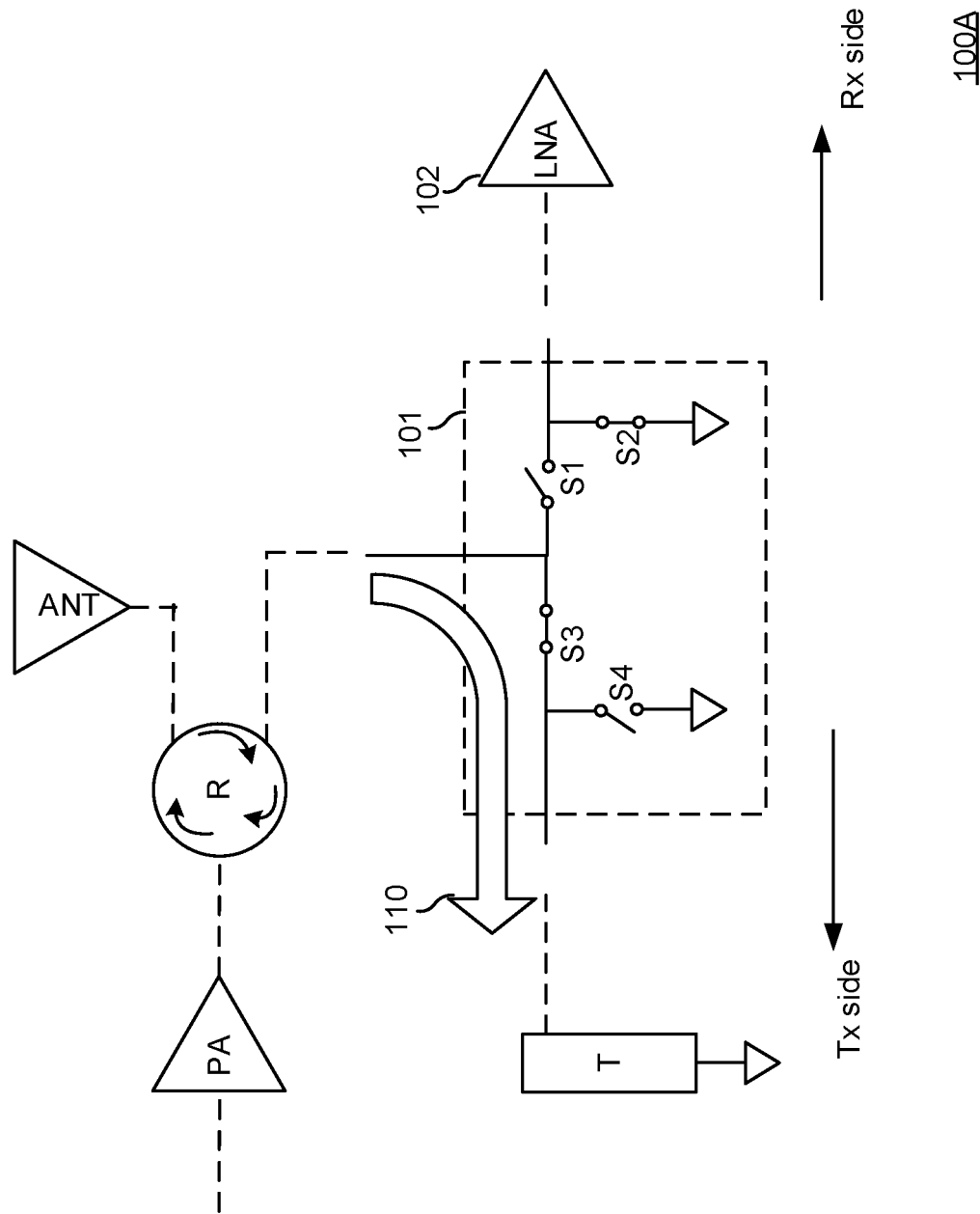
FIG. 1B shows the prior art communication circuit of FIG. 1A operating in transmit mode.
Figure 1C:
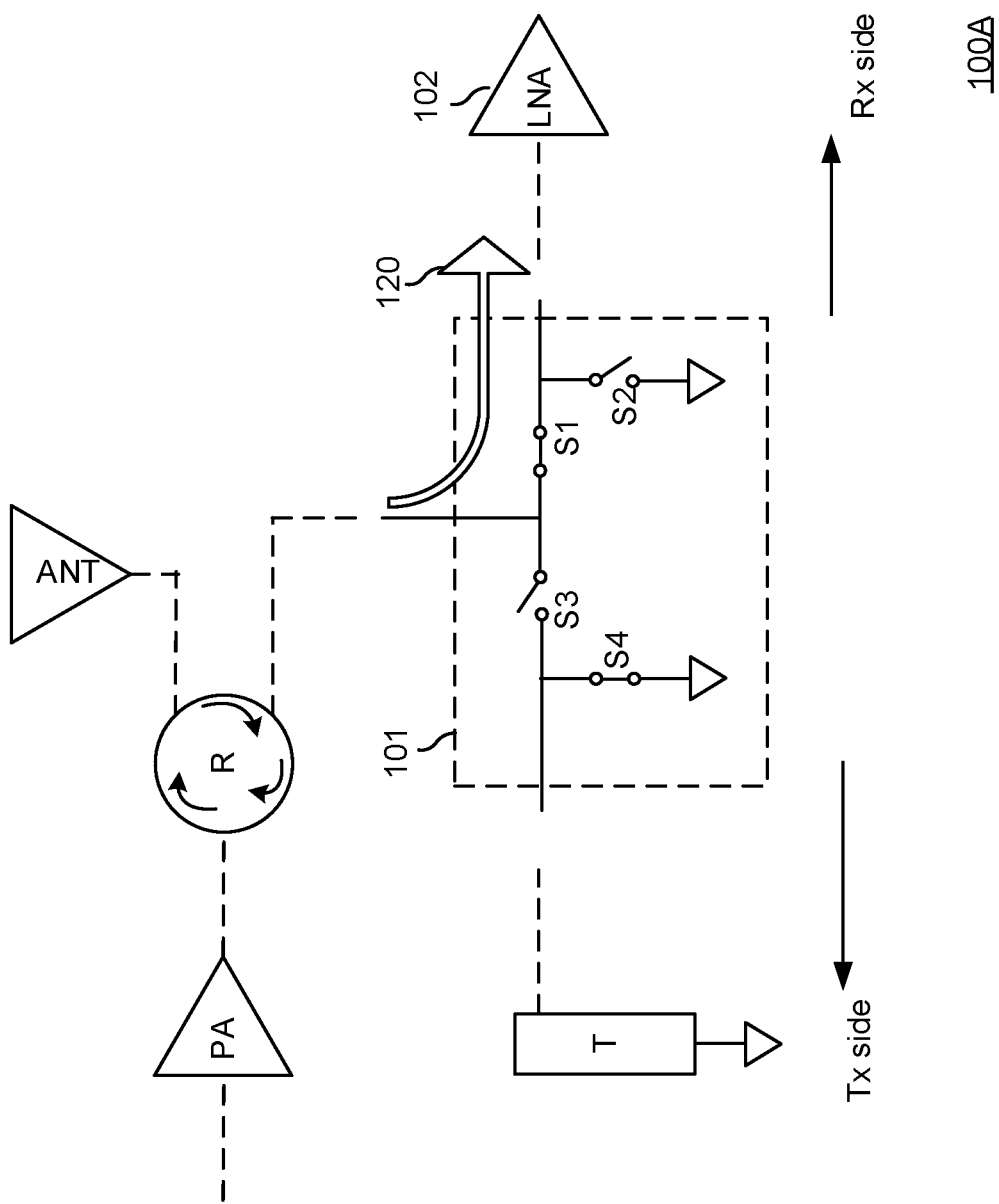
FIG. 1C shows the prior art communication circuit of FIG. 1A operating in receive mode.

By comparing circuit blocks (101, 201) of respective FIGS. 1A and 1B, it can be noticed that by virtue of introducing inductive and capacitive elements (L, C) and associated properties as part of the overall circuit, through and shunt switches (S1, S4) are no longer required and are replaced by L and C components providing a low impedance path to the receiver in receive mode and a high impedance path to the receiver in transmit mode. As a result, design challenges associated with the power handling requirements of the through switch (S1) are substantially reduced. Moreover, eliminating the need to design large switch stacks including a large number of transistors will provide the benefit of having a design with a smaller footprint.

With further reference to FIG. 2A, in accordance with an embodiment of the present disclosure, inductive element (L) may not be an additional element to be provided in the circuit block (201) and may instead be an off-chip repurposed inductive element already part of the matching network of LNA (201). This means that, by virtue of eliminating through switch (S1) of FIG. 1A from the signal path to the receiver and by additionally using existing inductors that are already part of the matching network, the insertion loss is substantially reduced and therefore the overall receiver noise figure (NF) is improved.

The person skilled in the art will understand that the embodiment as shown in FIG. 2A is an exemplary implementation of the present teachings, and other circuits and applications benefiting from the disclosed functionality of circuit block (201) may also be envisaged. As an example, any communication circuit with transmitters and receivers having different structures than the structure of communication circuit (200A) can also benefit from the teachings of the present disclosure. There are various applications where in general, there is a need to block or suppress high power signals reaching certain elements of the circuit. Such applications may also benefit from the disclosed teachings. Depending on the application, the position of inductive and capacitive elements (L, C) of FIG. 2A may be swapped. The disclosed teachings may also be used in communication circuits implementing one or more transmit ports and/or one or more receive ports. In some embodiments, inductive element (L) may comprise one or more inductors and/or inductors including resistive elements. In other embodiments, capacitive element (C) may be implemented using one or more capacitors and/or transistors/switches. Moreover, a high impedance value generated by the inductive element (L) in the transmit mode can also be obtained by choosing values for L and C so that the LC tank does not necessarily operate at the resonant frequency, but also at frequencies that are close to the resonant frequency, as long as a desired high impedance value across L and C is generated. Therefore, for the purpose of the present disclosure and claim language, the term "resonate" will also indicate behavior at frequencies that are sufficiently close to the resonant frequency to establish a desired high impedance value able to decouple the unwanted RF signal from the receiver in the transmit mode.

Turning now to the fail-safe switching applications and to further highlight the benefits of the disclosed methods and devices, reference is made to FIG. 3 where exemplary table (300) is shown. Such table compares, more in particular, circuit blocks (101, 201) of FIGS. 1A and 2A respectively. As can be seen, circuit block (201) uses a smaller number of switches (e.g. 2 vs. 4 in the embodiments shown in the previous figures) and due to elimination of the through switch on the receive side, switch block (201) can provide an improved power handling and implement switch stacks of smaller size (i.e. with less number of transistors). As a result of having a smaller number of switches and therefore less parasitic capacitances, circuit block (201) demonstrates an overall better performance without having to resort to capacitive compensation schemes which may be challenging to design. The critical bandwidth metrics of both architectures are the effective LNA bandwidth for Receive and the termination impedance (T) for Transmit. Since both architectures assume an inductively tuned LNA input, the Receive bandwidths are similar and often achieve, for example, greater than 1 GHz at 3 GHz. Concerning Transmit, the prior art termination path is wideband with switch parasitics defining the usable bandwidth. In the embodiment of FIG. 2A, the limited Q factor of the LC tank and the termination resistor (T) work together to define the usable bandwidth which is defined as 50+/−1 Ohm for the termination impedance. With this criteria the usable bandwidth is about, for example, 1.7 GHz with a % BW of 51% As it can also be noticed from table (300) of FIG. 3, capacitor (C) of FIG. 2A may be implemented off-chip, although embodiments where such capacitor is implemented on-chip may also be envisaged. Lastly, as further shown in table (300) the switching time associated with circuit block (201) is greater than that of circuit block (101). This again may be considered less of an issue in typical applications where power handling, footprint and overall NF may represent the more crucial features of communication circuits.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A radio frequency (RF) switch circuit for switching RF signals, comprising:
a common port configured to receive an RF signal with a signal frequency;
a first output port and a second output port;
a through switch configured to couple the common port to the second output port in a first mode (TX) of the RF switch circuit and decouple the common port from the second output port in a second mode (RX) of the RF switch circuit;
a shunt switch configured to couple the first output port to a reference potential in the first mode (TX) and decouple of the first output from the reference potential in the second mode (RX);
an inductive element between the common port and the first output port; and
a capacitive element between the second output port and the reference potential, wherein a combination of the inductive element and the capacitive element is configured to resonate at the signal frequency in the first mode (TX) by being connected together by the through switch and by the shunt switch, and combination of the through switch and the shunt switch connecting the inductor and the capacitive element to the reference potential, and
decouple, in the first mode (TX), the common port from the first output port and the second output port from the reference potential thus isolating, in the first mode (TX), the RF signal from the first output port.

2. An electronic circuit comprising:
the RF switch circuit of claim 1;
a low noise amplifier (LNA) coupled to the first output port; and
a transmit termination coupled to the second output port.

3. The electronic circuit of claim 2, further comprising:
a power amplifier configured to generate the RF signal in the first mode;
an antenna; and
a rotator configured to feed the RF signal to the antenna and to redirect a reflected RF signal from the antenna to the common port through the RF switch circuit in the first mode and feed the RF signal to the transmit termination in case of malfunction.

4. The electronic circuit of claim 2, further comprising an LNA matching network, the inductive element being an inductive element present in the LNA matching network.

5. The electronic circuit of claim 3, wherein the RF switch circuit is a fail-safe switch.

6. A transceiver comprising the electronic circuit of claim 5.

7. A communication system comprising the transceiver of claim 6.

8. The electronic circuit of claim 1, wherein the inductive element comprises one or more inductors and the capacitive element comprises one or more capacitors.

9. The RF switch circuit of claim 1, wherein the capacitive element comprises transistors.

10. In a radio frequency (RF) circuit with a through switch between a first RF port and a second RF port and a shunt switch between the first RF port and ground, a method for protection from an unwanted RF signal, comprising:
providing the RF circuit with an inductive element in series with the through switch between the first RF port and the second RF port, the inductive element having a selected inductance value; and
providing the RF circuit with a capacitive element between the second RF port and ground, the capacitive element having a selected capacitance value so that a tank circuit formed by the inductive element and the capacitive element resonates at a frequency of the unwanted RF signal when the through switch and the shunt switch are in an ON state, forming a high impedance path to the first RF port for the unwanted RF signal, thus decoupling the unwanted RF signal from the first RF port and routing the unwanted RF signal to the second RF port through the through switch.

11. The method of claim 10, wherein the first RF port is a first output port of the RF circuit.

12. The method of claim 11, wherein the first output port is connected to a receiver circuit.

13. The method of claim 12, wherein the receiver circuit comprises a low noise amplifier (LNA).

14. The method of claim 12, wherein the second RF port is a second output port of the RF circuit.

15. The method of claim 14, wherein the second output port is connected to a termination circuit.

* * * * *